J. D. MATTHEWS.
MACHINE FOR MAKING CEMENT BLOCKS.
APPLICATION FILED JUNE 27, 1911.

1,049,505.

Patented Jan. 7, 1913.

3 SHEETS—SHEET 1.

Witnesses
J. Adolph Bishop
C. S. Brown

Inventor
John D. Matthews
by
Foster Freeman Watson Ford
Attorneys

J. D. MATTHEWS.
MACHINE FOR MAKING CEMENT BLOCKS.
APPLICATION FILED JUNE 27, 1911.
1,049,505.
Patented Jan. 7, 1913.
3 SHEETS—SHEET 2.
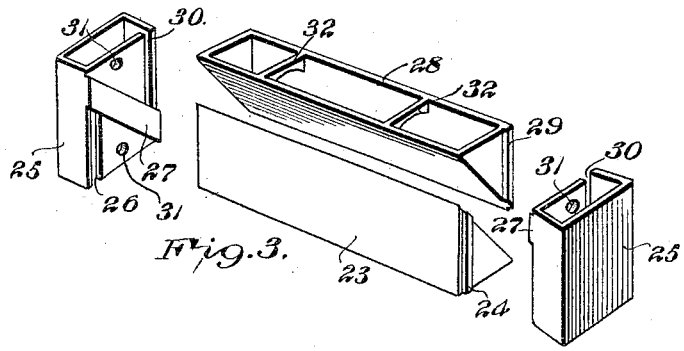
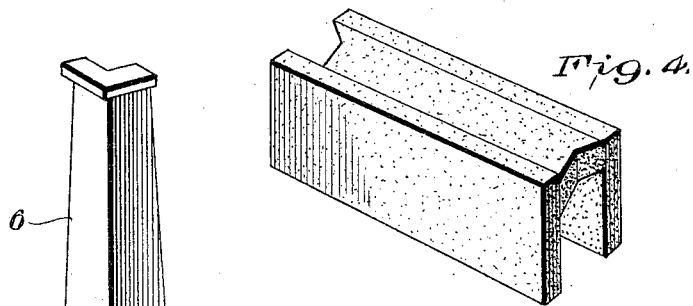
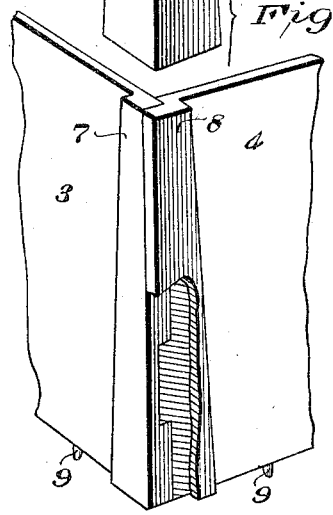
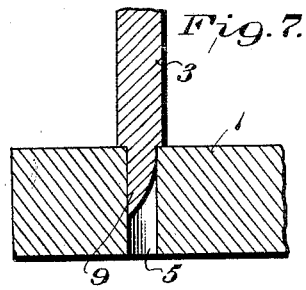
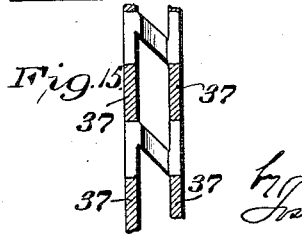
Witnesses
J. Adolph Bishop
C. S. Brown
Inventor
John D. Matthews
by
Foster Freeman Watson Hort
Attorneys J. D. MATTHEWS.
MACHINE FOR MAKING CEMENT BLOCKS.
APPLICATION FILED JUNE 27, 1911.
1,049,505.
Patented Jan. 7, 1913.
3 SHEETS—SHEET 3.
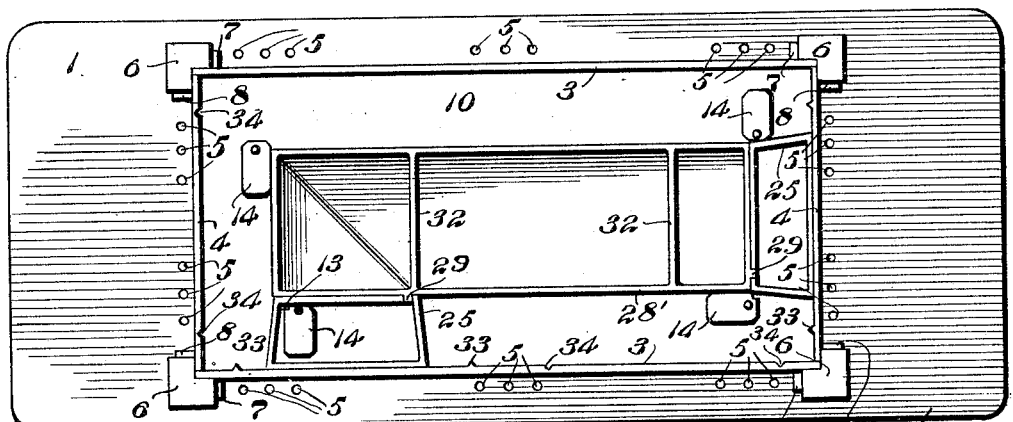
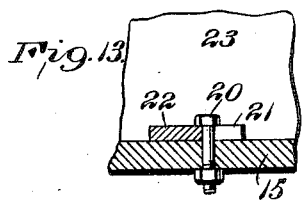
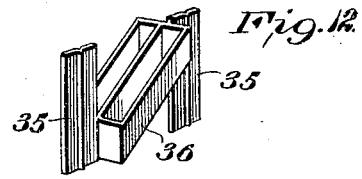
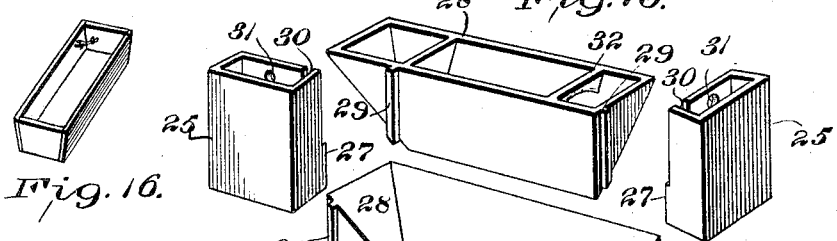
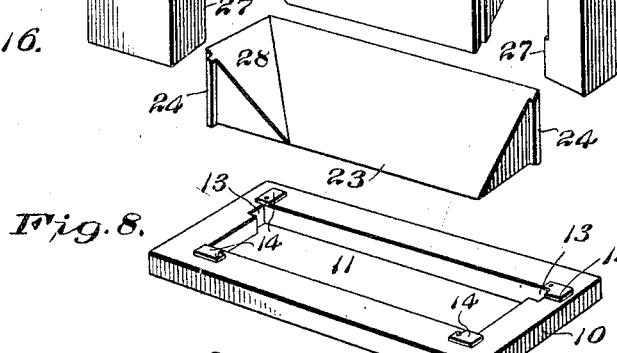
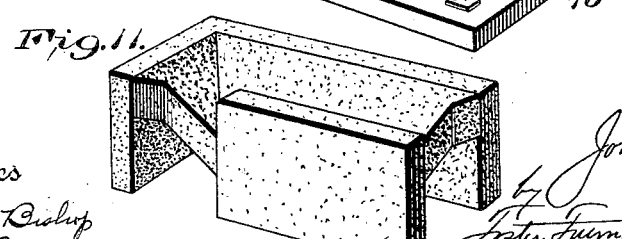
Witnesses
J. Adolph Bishop
C. D. Brown.
Inventor
John D. Matthews
by
Foster Furman Watson Hort
Attorneys
COLUMBIA PLANOGRAPH CO., WASHINGTON, D. C.

UNITED STATES PATENT OFFICE.

JOHN D. MATTHEWS, OF WOOD RIVER, NEBRASKA.

MACHINE FOR MAKING CEMENT BLOCKS.

1,049,505.  Specification of Letters Patent.  Patented Jan. 7, 1913.

Application filed June 27, 1911. Serial No. 635,651.

*To all whom it may concern:*

Be it known that I, JOHN D. MATTHEWS, a citizen of the United States, and residing at Wood River, in the county of Hall and State of Nebraska, have invented certain new and useful Improvements in Machines for Making Cement Blocks, of which the following is a specification.

The present invention relates to an improvement in machines for making artificial stone or cement building blocks, and has for its object to provide a machine particularly adapted for the manufacture of blocks which when assembled will produce a wall that is not liable to be affected by moisture or frost.

A further object of the invention is to provide a machine for making blocks of such form that a wall built therefrom will contain passages or ducts through which pipes or a metal supporting frame can pass.

While the invention is adapted for making blocks of different cross sectional form the particular embodiment thereof herein illustrated is designed to produce blocks having recesses in both their top and bottom faces and of substantially N-shaped form in cross section, the inclined connecting web between the vertical members or face of the block being notched at its ends or reduced in length so that when such blocks are placed end to end there will be formed an opening or passage through which a pipe or pillar can extend.

Figure 1:
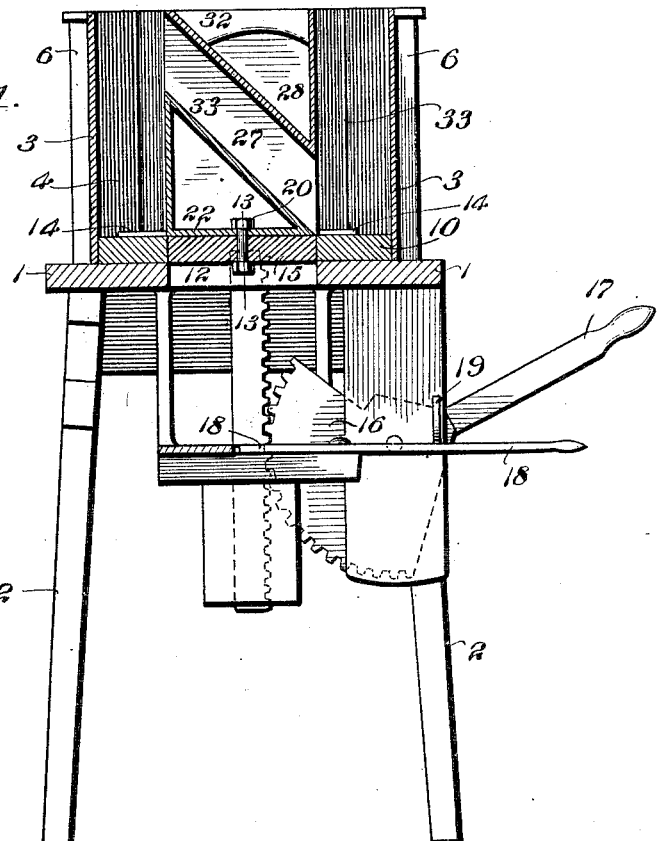
Figure 2:
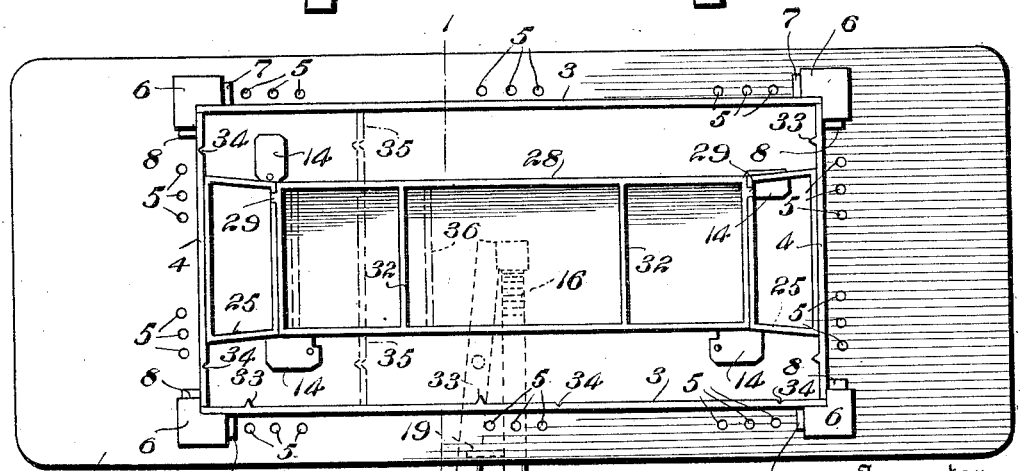

In the accompanying drawings: Figure 1 is a vertical sectional view through a machine constructed in accordance with the present invention, such view being taken substantially on the line 1—1 of Fig. 2;
Fig. 2 is a plan view of the machine shown in Fig. 1; Fig. 3 illustrates in separated perspective the several cores shown in Fig. 2; Fig. 4 is a detail view of the block produced by the arrangement of cores illustrated in Figs. 2 and 3; Fig. 5 is a detail view, on an enlarged scale, of the joint or connection between adjacent sides of the mold box; Fig. 6 is a detail view of one member of such joint viewed from the opposite side from that shown in Fig. 5; Fig. 7 is a detail view of the connection preferably employed between the lower ends of the sides of the mold box and the supporting base therefor; Fig. 8 is a detail view of the removable bottom plate of the mold box; Fig. 9 is a plan view of the machine showing the arrangement of cores employed for producing an angle or corner block; Fig. 10 illustrates in detached perspective the several cores shown in Fig. 9; Fig. 11 is a detail view of the block produced by the arrangement of cores shown in Figs. 9 and 10; Fig. 12 is a detail perspective view of an attachment employed when it is desired to make blocks of less length than the mold box; Fig. 13 is a detail view substantially on the line 13—13 of Fig. 1; Fig. 14 is a plan, and Fig. 15 a section of a wall built from blocks made in a machine embodying the invention; Fig. 16 is a detail view of an attachment that may be employed with the machine.

Referring to the drawings it will be seen that the machine comprises a supporting base 1, shown as having the form of a rectangular table mounted upon suitable legs 2 and supporting the mold box and other parts of the machine which are constructed as hereinafter described.

The mold box illustrated is of rectangular form and composed of the longer sides 3 and shorter sides or ends 4, said sides being supported by pins or studs projecting from their lower edges and extending into sockets 5 formed in the base 1. The vertical edges of the sides of the mold are provided with alternately arranged notches and tongues which, as shown in Fig. 5, are so alined that said side and end members can be brought close together. The joint thus formed is maintained by means of corner clamps 6 which, as shown, are adapted to engage vertically extending tapered ribs 7, 8 formed, respectively, upon the longitudinal and transverse sides of the box. When the clamps 6 are forced downwardly over the ribs 7, 8 the walls of the box will be held closely together and the pins 9, projecting from the lower edges of such sides, are so shaped that when the corner clamps are disengaged the walls of the box may be separated and caused to assume an inclined position with relation to the base 1. That is, as shown in Fig. 7, the said pins 9 are tapered or beveled on one face so that when the clamps 6 are removed the sides of the box may be separated to a considerable extent at their upper edges. This provides for removing the molded block and for inserting the removable bottom plate of the mold without detaching the sides of the box from the supporting base. It will be seen that the ribs 7, 8 extend over the joint formed by the interlocking tongues and sockets at the ends of the side walls of the box so that when the clamps 6 are in position a fluid-tight joint is provided at each corner of the box. The removable bottom plate 10 of the mold is illustrated in detail in Fig. 8. As shown this plate, which is adapted to fit closely within the sides of the box, is provided with an aperture 11 of such form and size as to permit the passage therethrough of the bottom core of the machine and this aperture is in alinement with an opening 12 formed in the base 1. When the sides of the mold box are in vertical position they contact closely with the edges of the bottom plate 10 so that there is no danger of the material employed for making a block escaping through the joint between such members. As shown the aperture 11 in the plate 10 is provided at its corners with notch-like extensions 13 for a purpose hereinafter described, and adjacent each of said notches is pivotally secured a cover piece 14 which is adapted to be turned to completely close or entirely removed from above the adjacent notch 13.

The bottom core of the improved machine is supported by a vertically movable carrier comprising a rack and a head 15, the latter being adapted to pass freely through the apertures 12 and 11 in the base 1 and bottom plate 10. Vertical movement of the core support is effected by a pivoted sector 16 pivotally mounted on the supporting frame of the machine and provided with a handle 17. In order that said core support may be maintained in its upper position, or the position which it occupies when a block is being formed, the stem or rack is provided in one face with a socket or recess into which is adapted to extend the inner end of a locking lever 18, a spring 19 acting to force said lever into engagement with the rack. By moving the lever 18 laterally to disengage it from the rack the bottom core may be withdrawn from the mold box through the openings in the plate 10 and base 1.

In order to form a block having the characteristics of that hereinbefore described there are provided a series of four cores, the cross sectional form of the top and bottom cores being varied in accordance with the cross sectional form of the block to be produced.

As the embodiment of the machine illustrated is intended to produce blocks of substantially N-form in cross section the bodies of the top and bottom cores herein illustrated are substantially triangular in cross section, said cores being reversely arranged so that the finished block will have recesses in its top and bottom surfaces, which recesses will be separated by an inclined web. The drawings illustrate cores adapted to form blocks of this character adapted both for the straight side walls of a building and also to form corner blocks. The same set of end cores may be employed in forming either the straight or corner blocks but different sets of top and bottom cores are required. The several cores are made hollow and are so connected and supported that they may be readily withdrawn from the block after the material thereof is properly set. The bottom core is detachably connected with its support 15 by means of headed bolts 20 secured to said support and adapted to extend into slots 21 formed in cross bars 22 connecting opposite sides of the core whereby when the core is withdrawn from the mold blocks a slight longitudinal movement thereof on its support will disengage it. Said bottom core 23, which will be of the form shown in Figs. 3 and 10, according to the character of block to be produced, is provided at its ends with vertically extending ribs or beads 24 which have the cross sectional form of and are adapted to extend through the correspondingly positioned notches or extensions 13 of the aperture in the removable bottom plate 10. As shown in Figs. 2 and 9 the cover pieces 14 are adjusted so as to uncover those notches 13 in the plate 10 which correspond in position to the ribs on the bottom core and to cover the other of said notches. The end cores 25 are provided with suitable slots 26 to receive the ribs 24 on the bottom core and on their inner faces said end cores are provided with projecting sections 27 that extend over and bear closely against the upper surface of the bottom core when said core is in its elevated position. The top cores 28 or 28′ are similarly provided with ribs 29 adapted to enter corresponding slots 30 in the end cores and the lower face of said top cores rests upon the upper surfaces or edges of the projecting sections 27 of the end cores so that the top core is supported by the end cores and also maintained out of contact with the bottom core. The end cores extend from the top and bottom cores to the sides of the mold box and, as shown, such end cores are gradually reduced in width from their outer to their inner ends so that they may be readily withdrawn from the molded block. As shown the inner wall of each end core near each of its ends is provided with an aperture 31 adapted to receive a suitable implement such as a hook by which it may be withdrawn from the block and mold. The top core may be internally braced by suitable cross pieces 32 which can serve as handles for lifting such core from the box.

It will be seen that the base 1 is adapted to support mold boxes of different sizes and it is therefore provided with a plurality of series of sockets 5. The inner surfaces of the sides of the mold box, except the side which is to form the outer face of the finished block, are provided with suitable inward projections 33 and notches 34 adapted to form grooves and ribs upon the block which will act to key adjacent blocks when assembled in a wall.

If it is desired to make blocks of less length than the mold box the separator shown in Figs. 2 and 12 may be employed. This separator comprises two vertical members 35 connected by a tubular member 36, the top and bottom edges of which are adapted to fit closely against the adjacent surfaces of the top and bottom cores while the outer edges of the members 35 will bear against the inner faces of the sides of the mold boxes. Fig. 2 shows this attachment in position, in dotted lines, and as the same can be positioned at any point in the length of the top and bottom cores it will be seen that by means thereof the mold box is adapted to produce blocks of any desired length and if both long and short blocks are desired the two can be obtained by one operation of the machine.

When blocks constructed by the machine herein described are assembled in a wall the latter will contain a series of hollow chambers or spaces owing to the cross sectional form of the blocks, and as the inclined web of each block is shorter than the sides of the block an aperture will be formed between the ends of the webs of adjacent blocks. By building a wall of alternate courses of blocks such as herein described and rectangular slabs 37, said apertures in the alternate courses can be alined so as to form passages through which pipes such as required for heating, gas, or water, can be introduced or by properly proportioning the parts such apertures can be fitted about the uprights or columns of a steel frame, for example. If it is desired to have all of the blocks employed in the building of the same cross sectional form the blocks required for the alternate courses can be produced by employing in the machine an attachment such as shown in Fig. 16, consisting of a device such as the member 36 of the separator shown in Fig. 12, said device being composed of sections so assembled that they can be detached to be readily removed from the molded block. By positioning such a device at an intermediate point in the length of the top and bottom cores it will be seen that there will be produced in the inclined web an aperture similar in form to that produced by the action of the two end cores.

It will be understood that the inner surface of that side of the mold box which is to form the outer face of the finished block will be of such character as to provide a smooth "rock" or other suitable "face" on the molded block.

Having thus described the invention, what is claimed and desired to secure by Letters Patent is:

1. In a cement block making machine, the combination of a mold box, a bottom core in said box, end cores having members that project over the upper surface of the bottom core, and an upper core supported by said projecting members.

2. In a cement block making machine, the combination of a mold box, a bottom core movable downwardly through an aperture in the bottom of the box, end cores interlocked with the bottom core when the latter is within the box, and a top core interlocked with and supported by said end cores out of contact with the bottom core.

3. In a cement block making machine, the combination of a mold box, a bottom core provided with vertically extending ribs, end cores having means for engaging said ribs, and a top core supported by the end cores.

4. In a cement block making machine, the combination of a mold box, a bottom core provided with vertically extending ribs, end cores having means for engaging said ribs and provided with members that project above the upper face of the bottom core, and a top core supported by said projecting members of the end cores.

5. In a machine for making cement blocks, the combination of a mold box having an aperture formed in its bottom and provided at suitable points with a series of notch-like extensions, a core adapted to move vertically through said aperture and having a plurality of exterior vertical ribs each positioned to aline with one of the extensions of said aperture, and means for closing the extensions of the aperture in the bottom of the mold which are out of alinement with the ribs on said core.

6. In a machine for making cement blocks, the combination of a mold box having an aperture formed in its bottom and provided at suitable points with a series of notch-like extensions, a bottom core adapted to move vertically through said aperture and having a plurality of exterior vertical ribs each positioned to aline with one of the extensions of said aperture, means closing the extensions of said aperture not in alinement with the ribs on said core, end cores adapted to engage the ribs on the bottom core, and a top core adapted to be supported in the box out of contact with the bottom core.

7. In a machine for making cement blocks, the combination of a mold box having an aperture formed in the bottom and provided at suitable points with a series of notch-like extensions, a bottom core adapted to move vertically through said aperture and having a plurality of exterior vertical ribs each positioned to aline with one of the extensions of said aperture, means closing the extensions of said aperture not in alinement with the ribs on said core, end cores adapted to engage the ribs on the bottom core, and a top core supported by the end cores out of contact with the bottom core.

8. In a cement block making machine, the combination of a mold box, a bottom core having a transversely inclined upper face, a top core having an inclined lower face, and end cores adapted to maintain the inclined faces of the top and bottom cores parallel and out of contact with each other, the box and cores being relatively movable, whereby the machine is adapted to produce blocks each having in its top and bottom surfaces longitudinally extending recesses separated by an inclined web, the ends of which are recessed, as described.

9. In a cement block machine, the combination with a mold box, of top and bottom cores supported in the box by means permitting movement of each thereof from the box, independent of any adjustment of the other, the opposing faces of said cores being held in parallelism and extending at an inclination to the vertical sides of the box, for the purpose described.

10. In a cement block machine, the combination with a mold box, of a bottom core movable vertically through the bottom of the box, and having its upper face extending at an inclination to the sides of the box, and an upper core supported in the box by means adapted to maintain its lower face parallel to and out of contact with the upper face of the bottom core and permitting withdrawal of the bottom core from the box independent of any adjustment of the upper core, for the purpose described.

In testimony whereof I affix my signature in presence of two witnesses.

JOHN D. MATTHEWS.

Witnesses:
H. E. BRUNNER,
J. E. BRIDGER.

---

Copies of this patent may be obtained for five cents each, by addressing the "Commissioner of Patents, Washington, D. C."